(12) United States Patent
Sander-Edwards et al.

(10) Patent No.: US 11,520,819 B2
(45) Date of Patent: Dec. 6, 2022

(54) SYSTEMS AND METHODS FOR CONTEXT-BASED CONTENT GENERATION

(71) Applicant: Adeption Limited, Auckland (NZ)

(72) Inventors: Carl Sander-Edwards, Tiburon, CA (US); Amol Deshpande, Pune (IN)

(73) Assignee: Adeption Limited, Auckland (NZ)

( * ) Notice: Subject to any disclaimer, the term of this patent is extended or adjusted under 35 U.S.C. 154(b) by 234 days.

(21) Appl. No.: 17/019,139

(22) Filed: Sep. 11, 2020

(65) Prior Publication Data

US 2021/0073261 A1  Mar. 11, 2021

Related U.S. Application Data

(60) Provisional application No. 62/898,707, filed on Sep. 11, 2019.

(51) Int. Cl.
*G06F 16/40* (2019.01)
*G06F 16/435* (2019.01)
*G06F 16/483* (2019.01)
*G06F 16/45* (2019.01)

(52) U.S. Cl.
CPC ............ *G06F 16/437* (2019.01); *G06F 16/45* (2019.01); *G06F 16/483* (2019.01)

(58) Field of Classification Search
CPC ....... G06F 16/437; G06F 16/45; G06F 16/483
See application file for complete search history.

(56) References Cited

U.S. PATENT DOCUMENTS

| | | | |
|---|---|---|---|
| 9,727,618 B2 * | 8/2017 | Sharp | G06F 16/335 |
| 2018/0039910 A1 * | 2/2018 | Hari Haran | G06F 16/24578 |
| 2019/0132492 A1 * | 5/2019 | Paluri | H04N 21/4788 |
| 2019/0258741 A1 * | 8/2019 | Chen | G06F 16/9535 |

OTHER PUBLICATIONS

Maciej Kula, "Metadata Embeddings for Userand Item Cold-start Recommendations," 2015 [retrieved on Jul. 15, 2022], arXiv: 1507.08439v1. Retrieved from the Internet: < URL: https://doi.org/10.48550/arXiv.1507.08439 >. (Year: 2015).*

* cited by examiner

*Primary Examiner* — Kristopher Andersen
(74) *Attorney, Agent, or Firm* — Ryan Alley IP

(57) ABSTRACT

This invention discloses a computer-implemented method, caused by a server, for hierarchical causality-based stitching of content and for serving said stitched content as output content, said method comprising: tracking, and measuring, a first set of markers, for a first content consumer, consuming a first content item; tracking, and measuring, a first set of markers, for a second content consumer, consuming a second content item; receiving, by said first content consumer, a request corresponding to a marker from said first set of markers; computing a "pertinence indicator"; computing a "colliding score"; automatically collating said first content item, correlative to said first user, and a second content item, correlative to said second user, to form at least an output content, if said "pertinence indicator" is within said pre-defined rules of correlation and if said "colliding score" is within said pre-determined threshold; and serving said collated output content.

24 Claims, 14 Drawing Sheets

SYSTEMS AND METHODS FOR CONTEXT-BASED CONTENT GENERATION

RELATED APPLICATIONS

This application claims priority under 35 U.S.C. § 119 to U.S. Provisional Application 62/898,707, filed Sep. 11, 2019 and incorporated by reference herein in its entirety.

FIELD

This invention relates to the field of computer networks and artificial intelligence. Particularly, this invention relates to a system and method for context-based content generation.

BACKGROUND

Abundance of content and abundance of objectives for each content item create a labyrinth of sorts for a consumer of the content. From content searching to content consumption is a wayward/random path which does not necessarily tie up with an objective of a content consumer.

Notwithstanding the fact that while classification of content items, in itself, is a laborious task, it is an inexact science since it involves interpretation of a classifier. Thus, each content item may only be classified as per a classifier's rules. More classifiers may be employed for the same content items; however, just classification becomes a mammoth exercise—let alone the question of it being useful.

On another note, in terms of consumption of content, one of the scenarios is in the field of training programs. One of the adages that businesses live by is "What gets measured gets managed" (by Peter Drucker).

There is a need to define, and additionally generate, content with a specific purpose. This purpose needs to be measured in order to make it scientific, in nature, and to make it repeatable. Additionally, in order to increase efficiencies or to record growth, this repeatable measurement of causality, with the cause being consumption of content and the effect being an increase in a previously measured marker of a consumer, provide an important cue.

With respect to the abundance of content items, a consumer of a content item is in the most advantageous position to pose as a classifier for that content item since the context (insight) is already built into this consumer while classifying. Thus, at least one level of context-driven or context-specific classification must come from a consumer of the content item.

Additionally, another level of context which is a system-driven context should be built in.

Adding a static system-driven context and a dynamic consumer-driven context provides holistic classification criteria for content for future consumers.

There is, also, a need for a system and a method which obviates the problems of the prior art and provides a solution to the same.

SUMMARY

An object of the invention is to provide a system and method which provides new content based on existing content and user-generated content; in a seamless manner.

Another object of the invention is to provide a system and method which intelligently directs a consumer/user towards new formed content based on existing content and user-generated content; in a seamless manner.

Yet another object of the invention is to provide a system and method which serves insight-specific content items.

Yet another object of the invention is to provide a system and method which serves growth-specific content items.

Yet another object of the invention is to provide a system and method which serves performance-specific content items.

According to this invention, there is provided a computer-implemented method, caused by a server, for hierarchical causality-based stitching of content and for serving said stitched content as output content, said method comprising:
  tracking, and measuring, a first set of markers (base markers), for at least a first content consumer, consuming at least a first content item, from a first content set, on networked corresponding electronic devices;
  presenting, to said first content consumer, said first set of markers (base markers) being static input data;
  tracking, and measuring, a first set of markers (base markers), for at least a second content consumer, consuming at least a second content item, from a second content set, on networked corresponding electronic devices;
  receiving, by said first content consumer, a request corresponding to at least a marker from said first set of markers (base markers), said request being dynamic input data;
  computing at least a "pertinence indicator" by correlating meta-tags of said first content and said second content to determine correlativeness between said first content and said second content according to pre-defined rules of correlation;
  computing at least a "colliding score" by checking if said tracked and measured first set of markers (base markers) of said first content consumer are within a pre-determined threshold of said tracked and measured first set of markers (base markers) of said second content consumer;
  verifying if said "colliding score" of said first user and said second user is within said pre-determined threshold;
  searching for another second user consuming said second content if said "colliding score" is not within said pre-determined threshold
  automatically collating said at least a first content item, correlative to said first user, and at least a second content item, correlative to said second user, to form at least an output content, if said "pertinence indicator" is within said pre-defined rules of correlation and if said "colliding score" is within said pre-determined threshold; and
  serving said collated output content, to said first content consumer, on said networked corresponding consumer electronic.

According to this invention, there is also provided a computer-implemented method, caused by a server, for hierarchical causality-based stitching of content and for serving said stitched content as output content, said method comprising:
  tracking, and measuring, a first set of markers (base markers), for at least a content consumer, consuming at least a first content item, from a first content set, on networked corresponding electronic devices;
  presenting, to said content consumer, said first set of markers (base markers) being static input data;

receiving, by said content consumer, a request corresponding to at least a marker from said first set of markers (base markers), said request being dynamic input data;

automatically collating, said at least a first content item, from said first content set, and at least a second content item, from a second content set, in response to said request, to form at least a first "situation-action" content item;

tracking, and measuring, a second set of markers (action markers), for said at least a content consumer, consuming at least said first "situation-action" content;

presenting, to said content consumer, said second set of markers (action markers);

receiving, by said content consumer, a review request corresponding to at least a marker from said second set of markers (action markers);

automatically collating, said at least a first content item, from said first content set, and at least a third content item, from a third content set, in order to said review request, to form at least an "action-insight" content item;

tracking, and measuring, a third set of markers (insight markers), for said at least a content consumer, consuming at least said "action-insight" content;

presenting, to said content consumer, said third set of markers (insight markers);

receiving, by said content consumer, a reaction corresponding to at least a marker from said third set of markers (insight markers);

automatically collating said at least a first content item, from said first content set, and at least a third content item, from a fourth content set, to form at least an "insight-reaction" content;

tracking, and measuring, a fourth set of markers (reaction markers), for said at least a content consumer, consuming at least said "insight-reaction" content item;

presenting, to said content consumer, said fourth set of markers (reaction markers);

receiving, by said content consumer, a review request corresponding to said fourth set of markers (reaction markers);

automatically collating said at least a first content item, from said first content set, and at least a second content item, from said second content set, to form at least a second "situation-action" content; and serving said formed at least a second "situation-action" content, as an output content, to said content consumer on said networked corresponding consumer electronic.

According to this invention, there is also provided a system comprising:

one or more processors; and a non-transitory computer-readable medium or media comprising one or more sequences of instructions which, when executed by at least one of the one or more processors, causes steps to be performed comprising:

tracking, and measuring, a first set of markers (base markers), for at least a first content consumer, consuming at least a first content item, from a first content set, on networked corresponding electronic devices;

presenting, to said first content consumer, said first set of markers (base markers) being static input data;

tracking, and measuring, a first set of markers (base markers), for at least a second content consumer, consuming at least a second content item, from a second content set, on networked corresponding electronic devices;

receiving, by said first content consumer, a request corresponding to at least a marker from said first set of markers (base markers), said request being dynamic input data;

computing at least a "pertinence indicator" by correlating meta-tags of said first content and said second content to determine correlativeness between said first content and said second content according to pre-defined rules of correlation;

computing at least a "colliding score" by checking if said tracked and measured first set of markers (base markers) of said first content consumer are within a pre-determined threshold of said tracked and measured first set of markers (base markers) of said second content consumer;

verifying if said "colliding score" of said first user and said second user is within said pre-determined threshold;

searching for another second user consuming said second content if said "colliding score" is not within said pre-determined threshold automatically collating said at least a first content item, correlative to said first user, and at least a second content item, correlative to said second user, to form at least an output content, if said "pertinence indicator" is within said pre-defined rules of correlation and if said "colliding score" is within said pre-determined threshold; and serving said collated output content, to said first content consumer, on said networked corresponding consumer electronic.

According to this invention, there is also provided a system comprising:

one or more processors; and a non-transitory computer-readable medium or media comprising one or more sequences of instructions which, when executed by at least one of the one or more processors, causes steps to be performed comprising:

tracking, and measuring, a first set of markers (base markers), for at least a content consumer, consuming at least a first content item, from a first content set, on networked corresponding electronic devices;

presenting, to said content consumer, said first set of markers (base markers) being static input data;

receiving, by said content consumer, a request corresponding to at least a marker from said first set of markers (base markers), said request being dynamic input data;

automatically collating, said at least a first content item, from said first content set, and at least a second content item, from a second content set, in response to said request, to form at least a first "situation-action" content item;

tracking, and measuring, a second set of markers (action markers), for said at least a content consumer, consuming at least said first "situation-action" content;

presenting, to said content consumer, said second set of markers (action markers);

receiving, by said content consumer, a review request corresponding to at least a marker from said second set of markers (action markers);

automatically collating, said at least a first content item, from said first content set, and at least a third content item, from a third content set, in order to said review request, to form at least an "action-insight" content item;

tracking, and measuring, a third set of markers (insight markers), for said at least a content consumer, consuming at least said "action-insight" content;
presenting, to said content consumer, said third set of markers (insight markers);
receiving, by said content consumer, a reaction corresponding to at least a marker from said third set of markers (insight markers);
automatically collating said at least a first content item, from said first content set, and at least a third content item, from a fourth content set, to form at least an "insight-reaction" content;
tracking, and measuring, a fourth set of markers (reaction markers), for said at least a content consumer, consuming at least said "insight-reaction" content item;
presenting, to said content consumer, said fourth set of markers (reaction markers);
receiving, by said content consumer, a review request corresponding to said fourth set of markers (reaction markers);
automatically collating said at least a first content item, from said first content set, and at least a second content item, from said second content set, to form at least a second "situation-action" content; and
serving said formed at least a second "situation-action" content, as an output content, to said content consumer on said networked corresponding consumer electronic.

In at least an embodiment, said first content item is a content item selected from expert content.

In at least an embodiment, said second content item is a content item selected from user-generated content.

In at least an embodiment, each of said steps of tracking and measuring comprising at least a step of tracking and measuring expert content.

In at least an embodiment, each of said steps of tracking and measuring comprising at least a step of tracking and measuring user-generated content.

In at least an embodiment, said method comprising at least a step of matching (first content) item to content (second item), said step comprising further steps of:
  receiving meta-tags correlative to tracked and measured said first content being consumed by said first user;
  representing each tracked and measured said first content as a first featured vectorised form using term frequency-inverse document frequency (TFIDF) method;
  receiving meta-tags correlative to tracked and measured said second content being consumed by said second user;
  representing each tracked and measured said second content as a second featured vectorised form using term frequency-inverse document frequency (TFIDF) method; and
  computing "pertinence indicator" for matching (first content) item to (second content) item as a function of distances, between said first featured vectorised form and said second featured vectorised form, correlative to said dynamic input data vector.

In at least an embodiment, said method comprising at least a step of user (i.e. consumer of content) to content (item) matching, said step comprising further steps of:
  receiving static input data of said first user;
  receiving dynamic input data of said first user;
  generating a second content engagement matrix and a correlative second content's meta-taga matrix, each of said matrices representing said second content's engagement with a user, content's popularity, and/or content's relevance;
  using said second content engagement matrix and said correlative second content's meta-tags matrix to train corresponding hybrid matrix factorisation models, in that, a first hybrid matrix factorisation model being generated for said first content and a second hybrid matrix factorisation model being generated for said second content; and
  comparing said first user's static input data with each of said matrices in order to collate a set of content items relevant to said first user.

In at least an embodiment, said method comprising at least a step of user (i.e. consumer of content) to content (item) matching, said step comprising further steps of:
  generating a matrix for each first user and their corresponding consumed content's engagement parameters;
  providing a weightage to each engagement parameter based on tracked and measured data of said first user's engagement with said first content;
  providing a weightage to each engagement parameter based on tracked and measured data of said second user's engagement with said second content;
  generating a 'first content interaction rating' as a function of each user's and its corresponding content's engagement parameters and associated weightage;
  generating a 'second content interaction rating' as a function of each user's and its corresponding content's engagement parameters and associated weightage;
  generating a first content feature matrix as a function of said generated 'first content interaction rating';
  generating a second feature interaction matrix as a function of said generated 'second content interaction rating';
  using said generated first content feature matrix to train a corresponding first hybrid matrix factorisation model;
  using said generated second content feature matrix to train a corresponding second hybrid matrix factorisation model; and
  using said trained first hybrid matrix factorisation model and said second hybrid matrix factorisation model, along with static data input and dynamic data input, in order to collate a set of first content and second content relevant to said first user's static data input and dynamic data input.

In at least an embodiment, said method comprising at least a step of a user (i.e. consumer of content) to user matching, said step comprising further steps of:
  computing "colliding score" for matching a first user and a second user, based on a pre-defined threshold, determined by comparing at least an attribute indicated by a first set of markers of said first user with at least the same attribute indicated by a first set of markers of said second user.

In at least an embodiment, said step of serving comprising a step of verifying licensing rights of said first content before serving said first content.

In at least an embodiment, said step of serving comprising a step of verifying licensing rights of said second content before serving said first content.

BRIEF DESCRIPTION OF THE DRAWINGS

The invention will now be described in relation to the accompanying drawings, in which:

FIG. 1 illustrates a first step, of the system and method of this invention, wherein FIG. 1 is a portion of a complete cycle, as shown in FIG. 5;

FIG. 2 illustrates a second step, of the system and method of this invention, wherein FIG. 1 is a portion of a complete cycle, as shown in FIG. 5;

FIG. 3 illustrates a step, of the system and method of this invention, wherein FIG. 1 is a portion of a complete cycle, as shown in FIG. 5;

FIG. 4 illustrates a fourth step, of the system and method of this invention, wherein FIG. 1 is a portion of a complete cycle, as shown in FIG. 5;

FIG. 5 illustrates a fifth step, of the system and method of this invention, wherein FIG. 1 is a portion of a complete cycle, as shown in FIG. 5;

DETAILED DESCRIPTION

Figure 2:
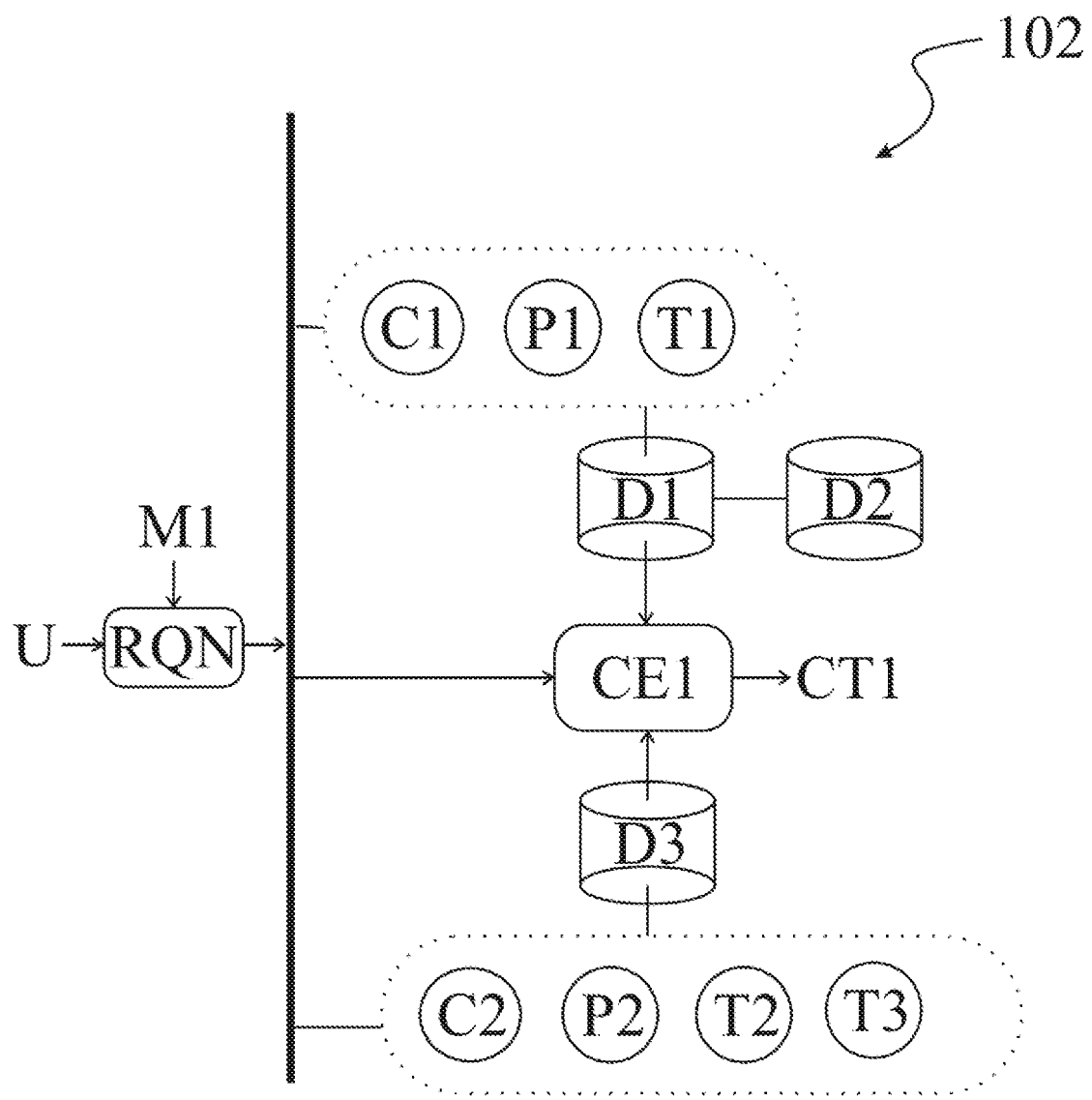

According to this invention, there is provided a system and method for context-based content generation.

For the purposes of this invention, the term 'content' or 'data' is configured to mean a one or more content items, each content item comprising an inherent context which is a static (expert) context, determined by at least a corresponding static meta-tag, and a user-defined context, determined by at least a corresponding dynamic meta-tag, which is a user-understood and, hence, a user-defined concept. Data/content may be system-generated or system-stored at a first level of hierarchy and, additionally, is user-generated or user-stored at a second level of hierarchy. Data and content may be multimedia data (i.e. text, images, sound, video, or their combinations). Throughout this specification, the terms 'metadata' and 'meta-tags' are intended to mean the same thing and are used, interchangeably.

In at least an embodiment, the term 'expert content' is a set of content data items comprising content data items which have been tagged as being expert content items through this system and method. 'Expert content', typically, comprises static meta-tags, configured to represent each 'expert content item', for future consumption, as vectors indicating those static meta-tags. These expert content vectors are a representation of the weight of the expert content data item, as defined by this system, along with a variable, but system-defined, correlation with another content item. This 'another content item' may be another 'expert content' or another 'user-generated content'. In at least an embodiment, 'system-defined' is static, in that, it is defined by this system and method. In at least an embodiment, each item from an 'expert content' data set is correlated with an 'attribute' selected from group consisting of a temporal attribute, a spatial attribute, a user-determined attribute, a system-defined attribute, a geographical attribute, a hierarchical attribute, a language attribute, a syntactic attribute, a ranking attribute, and the like attributes.

In at least an embodiment, the term 'user-generated content' is a set of content items comprising a set of content data items which have been generated by content consumers (i.e. users). 'User-generated content', typically, comprises dynamic meta-tags, configured to represent each 'user-generated content item', for future consumption, as vectors indicating those dynamic meta-tags. These user-generated content vectors are a representation of the weight of the user-generated content data item, as defined by this system, along with a variable, but user-defined, correlation with another content item. This 'another content item' may be another 'expert content' or another 'user-generated content'. In at least an embodiment, 'user-defined' is dynamic, in that, it is defined based on user-engagement using this system and method as well as by user-content-consumption using this system and method. In at least an embodiment, each item from an 'user-generated content' data set is correlated with an 'attribute' selected from group consisting of a temporal attribute, a spatial attribute, a user-determined attribute, a system-defined attribute, a geographical attribute, a hierarchical attribute, a language attribute, a syntactic attribute, a ranking attribute, and the like attributes.

For the purposes of this invention, the term 'consumer' is configured to mean an entity or a user who uses the data and its content items for achieving an objective or a goal.

For the purposes of this invention, the term 'objective' or 'goal' is configured to mean provisioning a consumer with consumer-centric data or consumer-based data. Additionally, the 'objective' or 'goal' is also to collate and/or weave user-generated content into pre-existing expert content data to build context-based new data and/or consumer-based new data. An objective or a goal is defined in terms of 'inflexion identifiers' in this specification. Essentially, each consumer (user) is tagged with a profile based on data received from the consumer (user) by a static data capturing node as well as based on data received from the consumer (user) by a dynamic data capturing node.

For the purposes of this invention, the term 'node' relates to a networked environment comprising 'electronic devices' used by 'users' (i.e. consumers) for consuming content. In a communications network, a 'node' or a 'network node' is a connection point that can receive, create, store, or send data along distributed network routes. Each network node has either a programmed or engineered capability to recognize, process, and forward transmissions to other network nodes. Each network node, also, has either a programmed or engineered capability to form connections with other nodes so as to form a new network based on pre-defined parameters such as a 'context'. Illustrative embodiments preferably are implemented on a conventional computer network. Among other things, a network includes at least two nodes and at least one link between the nodes. Nodes can include computing devices and routers. Nodes can also include link establishment mechanisms and protocols. Nodes can also include encoders and decoders. Nodes can also include switches. Nodes can also include transmitters, receivers, and transceivers. Nodes can be implemented in software in combination with hardware or as a virtual machine, or using network function virtualization. Nodes communicate via networks according to protocols, such as the well-known Internet Protocol (IP), Transmission Control Protocol (TCP), and the like. Especially, for this invention, each node comprises content items. Context is determined at two levels for this context; one at a system level and one at a consumer/user level. Depending on this determination of context, the network architecture changes to serve context-dependent and consumer-dependent data vis-à-vis content items. In at least an embodiment, a 'node' is defined by means of a split-level context (i.e. at least two contexts). Each of the contexts form a context vector (i.e. a first context vector and a second context vector). A context vector assigns a specific behaviour, weight, direction, and associative capabilities to a node which means that the node's position in a network is defined, a node's association with its connected node is defined, a node's relative position relative to associated nodes is defined, a node's input is defined (thereby defining behaviour), and a node's output is defined (thereby defining behaviour) by this context vector. Eventually, each context-vector determines relevancy of the node (and hence, the content item, and hence, the data) with respect to a consumer/user.

For the purposes of this invention, the term 'network', is an interconnected group of nodes. Interconnections may be wired or wireless. Therefore, these networks can be physical or virtual. More importantly, these networks are not fixed in their topography or their interconnections. How the nodes align or connect or communicably couple with each other to form a new network architecture, in order to obtain an output that is a function of split-level context determination, which is the subject matter of this invention.

For the purposes of this invention, the term 'context' is configured to mean a multi-faceted vector which affects at least a node in its networked environment. Context is a function of user, a situation depicted in a particular application, and a situation in which the application is used. It is to be noted that these applications are also nodes and may be associated with a user, its actions, and a relative environment. Hence, perspective of the user with reference to the environment, action sequence, and flow of events represent a context. Thus, context is typically represented by the properties of situation, relationships among events, and properties of events.

For the purposes of this invention, the term 'electronic devices' is configured to mean one or more wired, wireless, or networked devices used for consumption of content. Each of these 'electronic devices' is further configured to transmit and receive signals pertaining to the data being consumed and/or pertaining to the meta-tag of the data being consumed. In at least an embodiment, such data may be 'expert content' and/or 'user-generated content'.

For the purposes of this invention, the term, "pertinence indicator" refers to ranking of content items based on determined attributes. It helps place/rank a content item at a node in a network of nodes.

For the purposes of this invention, the term, "colliding score" refers to ranking of users based on its similarity and dissimilarity in terms of attributes. It helps place/rank a content item, as being consumed by its corresponding users, at a node in a network of nodes. According to a non-limiting exemplary embodiment, a colliding score can be said to be a one-degree-separated-colliding score if an output content item is similar to a consumed content item in one attribute (of consuming user) but is dissimilar to the consumed content item in another attribute (of consuming user).

For the purposes of this invention, the term, 'output content', is defined as a set of content data items which are set of stitched or correlated content items comprising at least an 'expert content item' and at least an 'user-generated content item' selected basis determined 'pertinence indicator' and 'colliding score'; the 'output content' comprising multi-faceted meta-tags, configured to represent each stitched set, for consumption by a user (consumer), as a multi-faceted vector whose:
  a) magnitude/weight is attained by/based on tracking meta-tags of content being consumed;
  b) direction is attained by/based on a boundary, defined by the parameters of edge learning network, determined by first set of markers, second set of markers, third set of markers, fourth set of markers; all of which are tracked by the system and method of this invention.

The 'output content' fulfills the following criteria:
  it is, therefore, hierarchically correlative to the content (expert or user-generated) being consumed, in that, the output is hierarchically separated, attribute-wise, having not more than two degrees of hierarchical separation for that particular user attribute derived from the dynamic input node;
  it is, therefore, in consonance with edge learning technique, in that the output has at least one attribute similar to a user's first set of markers and has at least one attribute dissimilar to the user's first set of markers.

According to a non-limiting exemplary embodiment, a consumer (user) uses a network, through which corresponding electronic devices are connected, for consumption of content items. The system and method of this invention aims to dynamically sort and present a set of content items based on at least a context pertinent to the consumer (user), this set being presented as a combination of expert content and user-generated content correlative to a determined pertinence indicator in consonance with at least a static input and at least a dynamic input.

Figure 1:
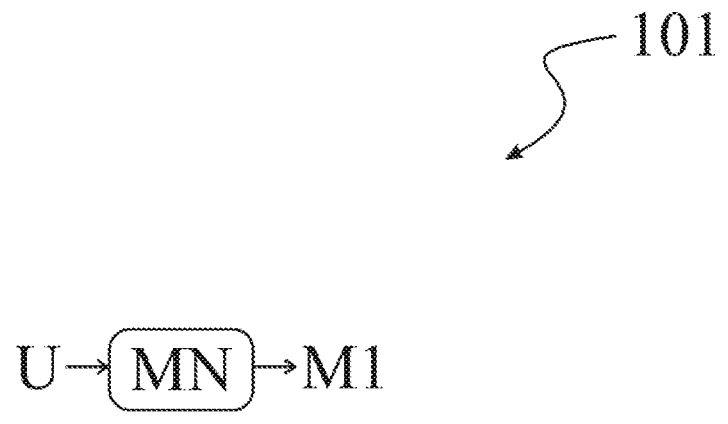

FIG. 1 illustrates a first step (101) of the system and method of this invention. Its eventual use is also seen, as portion of a complete cycle, in FIG. 5 of the accompanying drawings.

Figure 7A:
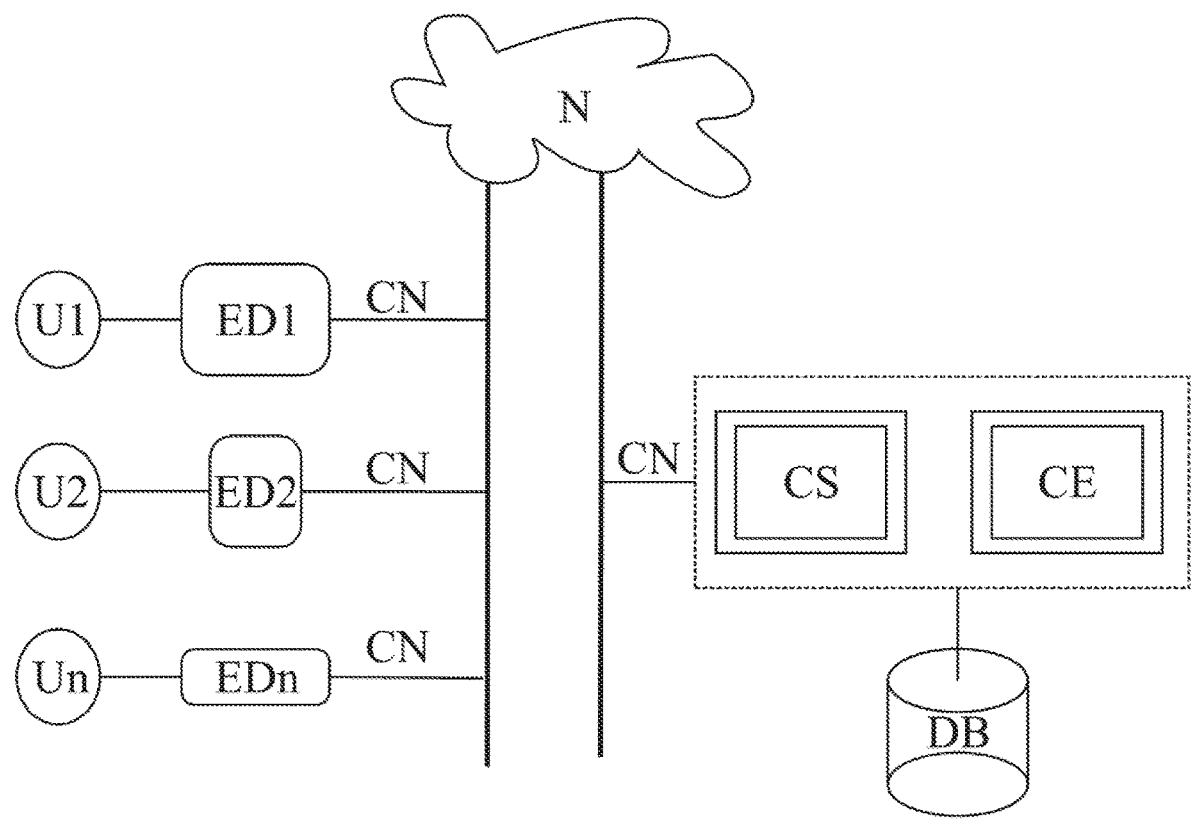
FIG. 7A illustrates an example computing network infrastructure, comprising electronic devices, used to provide content to be consumed to users/consumers.
Figure 7B:
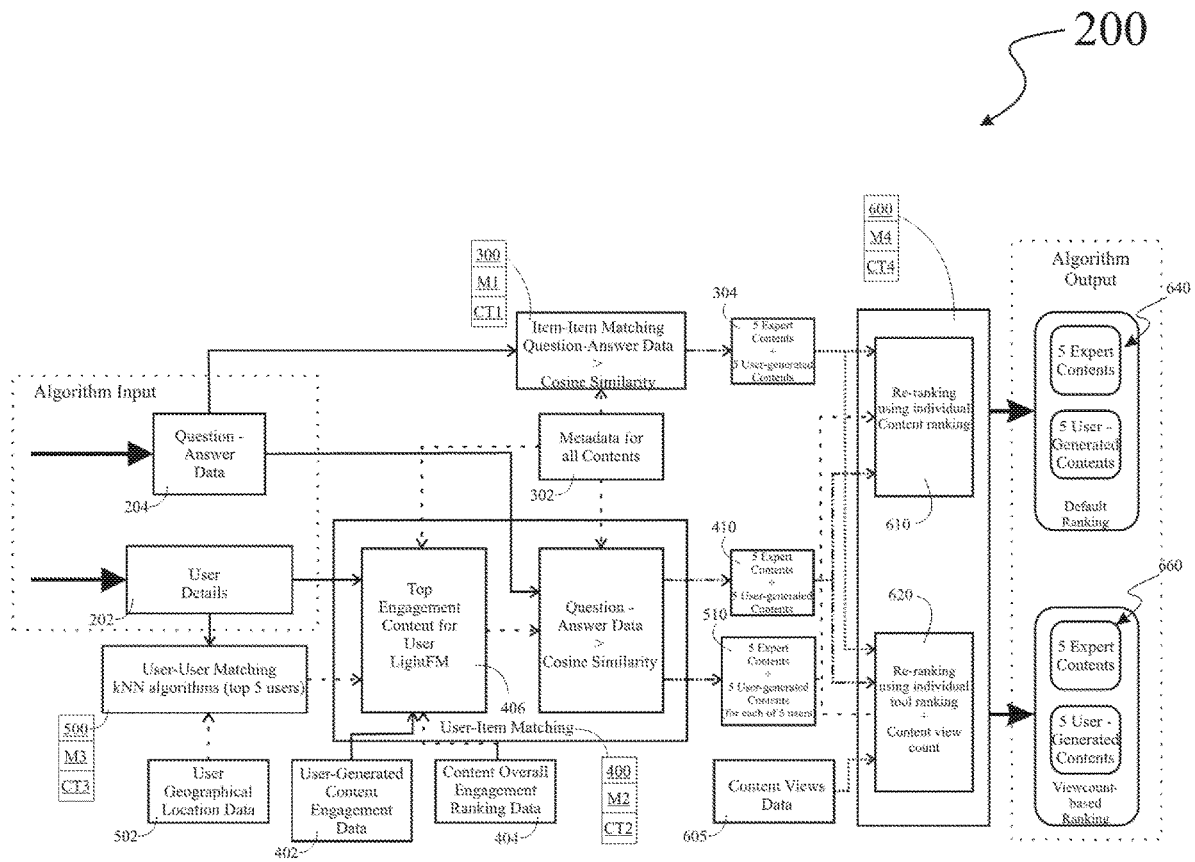
FIG. 7B illustrates a network architecture of the entire system and method of this invention.

FIG. 7B illustrates a network architecture of the entire system (200) and method of this invention.

FIG. 7A illustrates an example computing network infrastructure, comprising electronic devices (ED1, ED2, . . . , EDn), used to provide content (CN) to be consumed to users/consumers (U1, U2, . . . , Un). This computing network infrastructure comprises a communication server (CS) and client electronic devices devices (ED1, ED2, . . . , EDn), each client electronic device devices (ED1, ED2, . . . , EDn) being connected to the communications server (CS), through a network (N) for consuming content (CN). Each electronic device devices (ED1, ED2, . . . , EDn) is communicably coupled or hosts a sensor which tracks such content (CN) that is being consumed by the user (U1, U2, . . . , Un) of that electronic device (ED1, ED2, . . . , EDn). Upon sensing, the sensors relay a tracking signal to the communications server and an associated computing engine (CE) for processing the sensed signal. Communication server (CS) comprises a computing system configured to transmit content (CN) to client electronic devices (ED1, ED2, . . . , EDn). This may include a web-server, database, and application server configured to respond to requests from users through their corresponding client electronic device devices (ED1, ED2, . . . , EDn). The content, itself, may be stored in communicably coupled databases (DB).

In at least an embodiment, a static input data capturing node (202) is configured to capture static input data before and upon a user's (U) engagement with this system and method, through a networked electronic device. This static input data capturing node (202) is trained to capture user's identity and demographic data. Additionally, this static input data is configured to capture engagement metrics of the user's engagement with content items through this system and method.

In at least an embodiment, there is provided a first measuring node (MN) configured to sense and measure/quantify/track a user (U) in terms of a pre-defined first set of markers (base markers) (M1). This can be done in the form of questions posed to the user (U), in terms of tracking content consumed by a user, or the like. This first set of markers (M1) enumerates a first situation of the user (U). In at least an embodiment, the system's static input data capturing node (202) is used.

FIG. 2 illustrates a second step (102) of the system and method of this invention. Its eventual use is also seen, as portion of a complete cycle, in FIG. 5 of the accompanying drawings.

In at least an embodiment, a first crawler (C) and a first parser (P1) crawls through and parses through existing static (expert) content, from a first database (D1), at a first database node, and using natural language processing, identifies keywords and generates meta-tags in association with each pre-defined static (expert) content item. These static meta-tags are stored in a second database (D2), communicably coupled to the first database (D), at a second database node.

In at least an embodiment, a first tracker (T1) is configured to track user-activity vis-à-vis static (expert) content items resident on this system.

In at least an embodiment, there is provided a requesting node (RQN) configured to allow a user (U) to input queries in relation to certain profile parameters (i.e. base markers) which are mapped to the first set of markers (M1). In at least an embodiment, the system's dynamic input data capturing node (204) is used.

In at least an embodiment, a dynamic input data capturing node (204) is configured to capture dynamic input data whilst a user's engagement with this system and method, through a networked electronic device. Typically, the requesting node (RQN) is communicably coupled to the dynamic input data capturing node (204). Typically, this dynamic input data capturing node (204) is trained to capture In at least an embodiment, a computing engine is configured to compute a 'pertinence indicator' per user (U) based on:
  static input data of the user;
  dynamic input data of the user; and/or
  first set of markers (base markers) (M1) of the user.

In at least an embodiment, this 'pertinence indicator' is, iteratively, improved as and how various user's engage with this system and method and, the pertinence indicator if further improved based on:
  second set of markers (action markers);
  third set of markers (insight markers); and/or
  fourth set of markers (reaction markers).

In at least an embodiment, the 'pertinence indicator' is useful in the output of this system and invention as also in altering the vectors associated with the static content (expert content) as also the vectors associated with the dynamic content (user-generated content).

In at least an embodiment, a second crawler (C2) and a second parser (P2) crawls through and parses through stored content from a third database (D3).

In at least an embodiment, a second tracker (T2) is configured to track user-activity vis-à-vis sub-content items resident on this system.

In at least an embodiment, a third tracker (T3) is configured to track user-activity vis-à-vis user-generated content items resident on this system.

In at least an embodiment, a first correlative engine (CE1) is configured to correlate static (expert) content, from the first database (D1), with selected content from the third database (D3), at a third database node, the selection being based on the first set of markers and output of the requesting node (RQN). The correlated output of the first correlative engine (CE1) is "first_situation-action content (CT1)".

Figure 3:
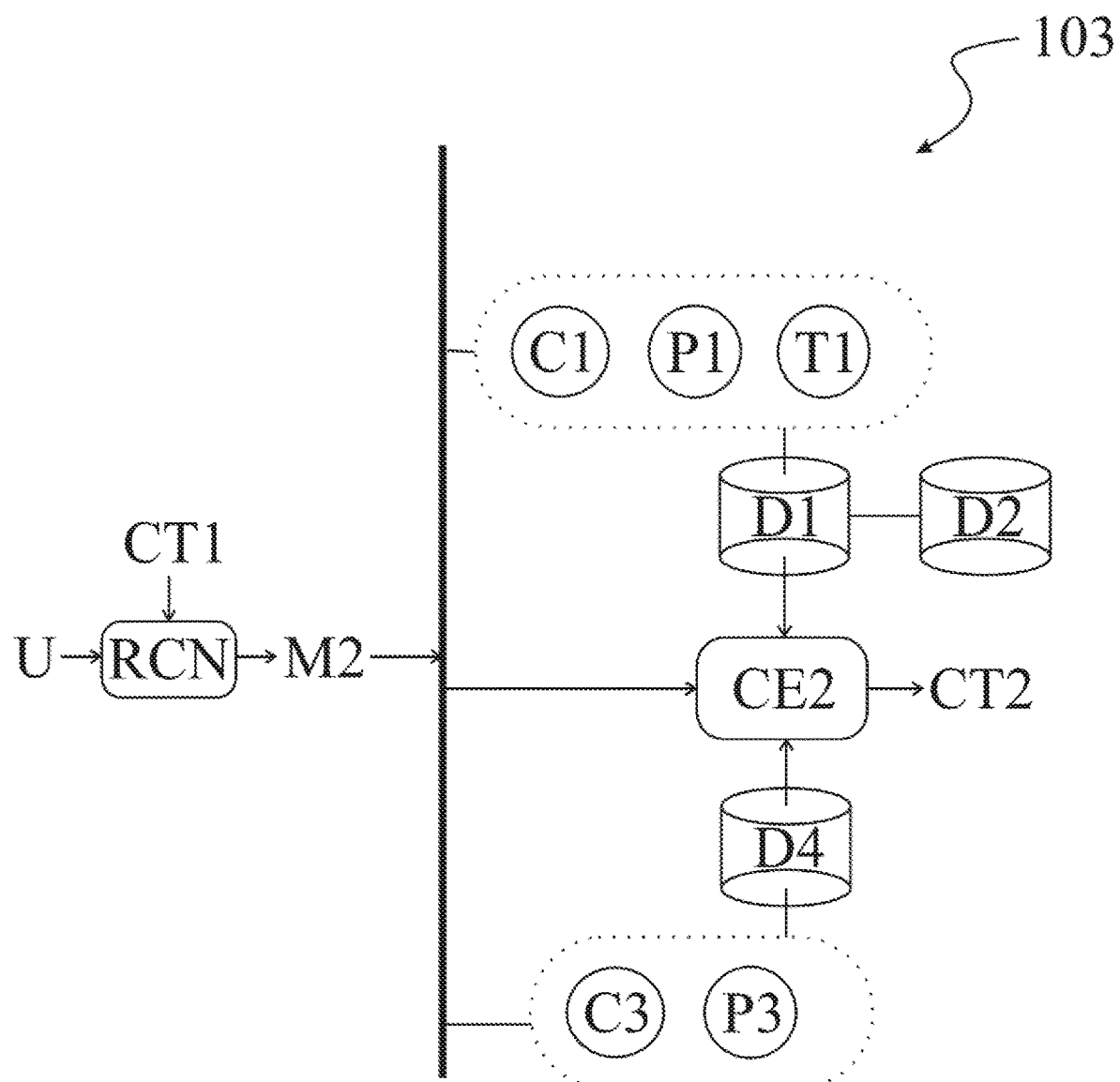

FIG. 3 illustrates a third step (103) of the system and method of this invention. Its eventual use is also seen, as portion of a complete cycle, in FIG. 5 of the accompanying drawings.

In at least an embodiment, a recording node (RCN) is configured to record a second set of markers (action markers) (M2) of the user (U); this second set of markers being action markers based on consumption of the first_situation-action content (CT).

In at least an embodiment, a third crawler (C3) and a third parser (P3) crawls through and parses through user-generated content per static content, stored on a first database (D), and using natural language processing, identifies keywords and generates meta-tags in association with each user-generated content item. These dynamic (user-generated-content) meta-tags are stored in a fourth database (D4), at a fourth database node.

In at least an embodiment, a second correlative engine (CE2) is configured to correlate user-generated content, of said fourth database (D4), with static (expert) content, of the first database (D), based on computed pertinence indicators which is a function of outputs of said first tracker, said second tracker, and said third tracker; along with correlating meta-tags of said static content and meta-tags of said user-generated content in order to output an interleaved dynamically formed new content, at an output node (display), for consumption. This dynamically formed new content is "action-insight content (CT2)".

Figure 4:
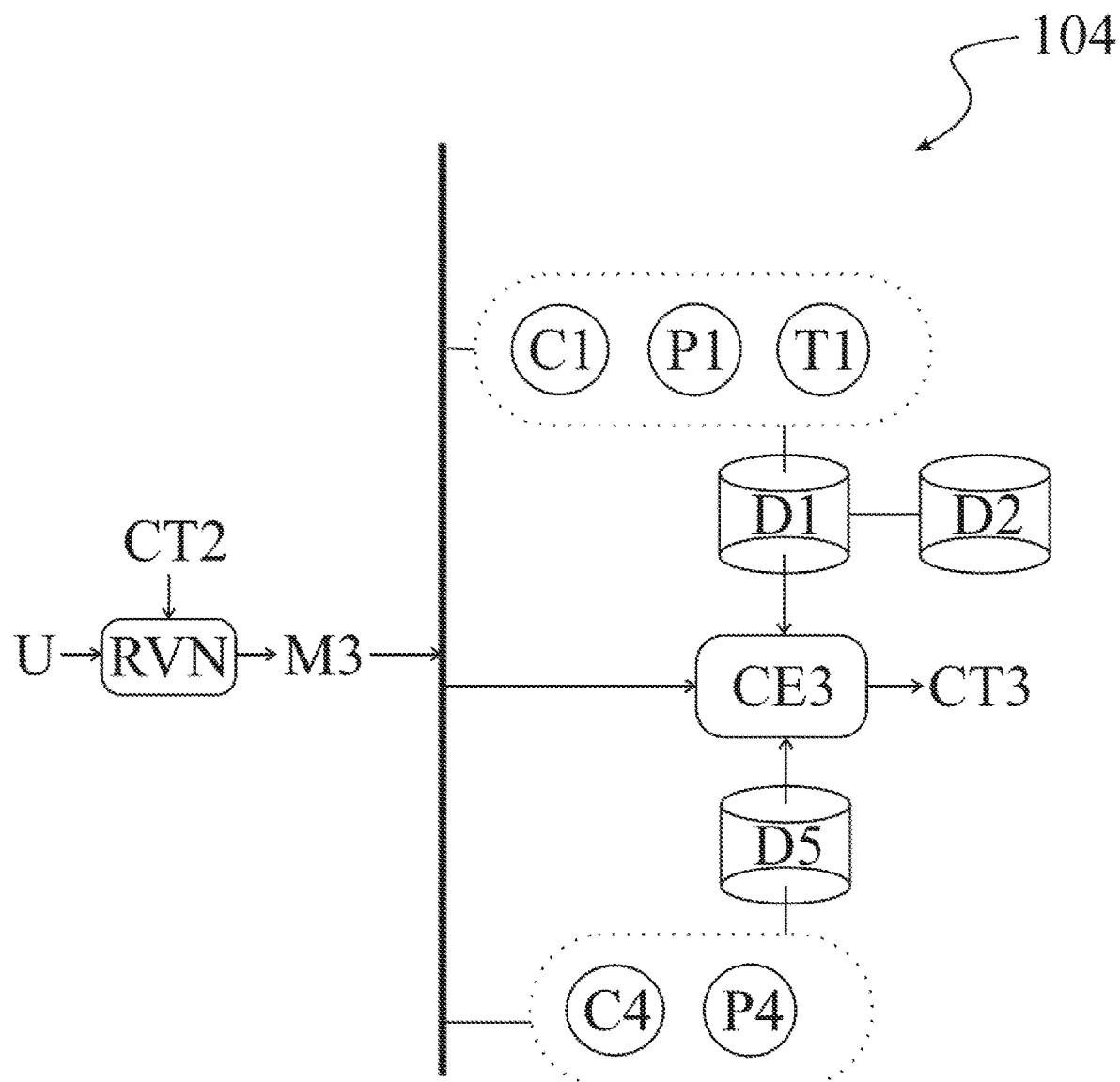

FIG. 4 illustrates a fourth step (104) of the system and method of this invention. Its eventual use is also seen, as portion of a complete cycle, in FIG. 5 of the accompanying drawings.

In at least an embodiment, there is provided a review node (RVN) configured to allow a user (U) to input additional queries in relation to certain profile parameters (i.e. base markers) which are mapped to the first set of markers (M1).

In at least an embodiment, the review node (RVN) is configured to review a third set of markers (insight markers) (M3) of the user (U); this third set of markers being insight markers based on action based on consumption of the action-insight content (CT2).

In at least an embodiment, a fourth crawler (C4) and a fourth parser (P4) crawls through and parses through a stored content from a fifth database (D5).

In at least an embodiment, a third correlative engine (CE3) is configured to correlate user-generated content with static content, of the fifth database (D5), based on computed pertinence indicators and computed colliding score which is a function of outputs of said first tracker, said second tracker, and said third tracker; along with correlating static meta-tags of said static (expert) content and dynamic meta-tags of said user-generated content in order to provide an output of "output content" (as defined, above), at an output node (display), for consumption through an electronic device. This dynamically formed new output content is "insight-reaction content (CT3)".

Figure 5:
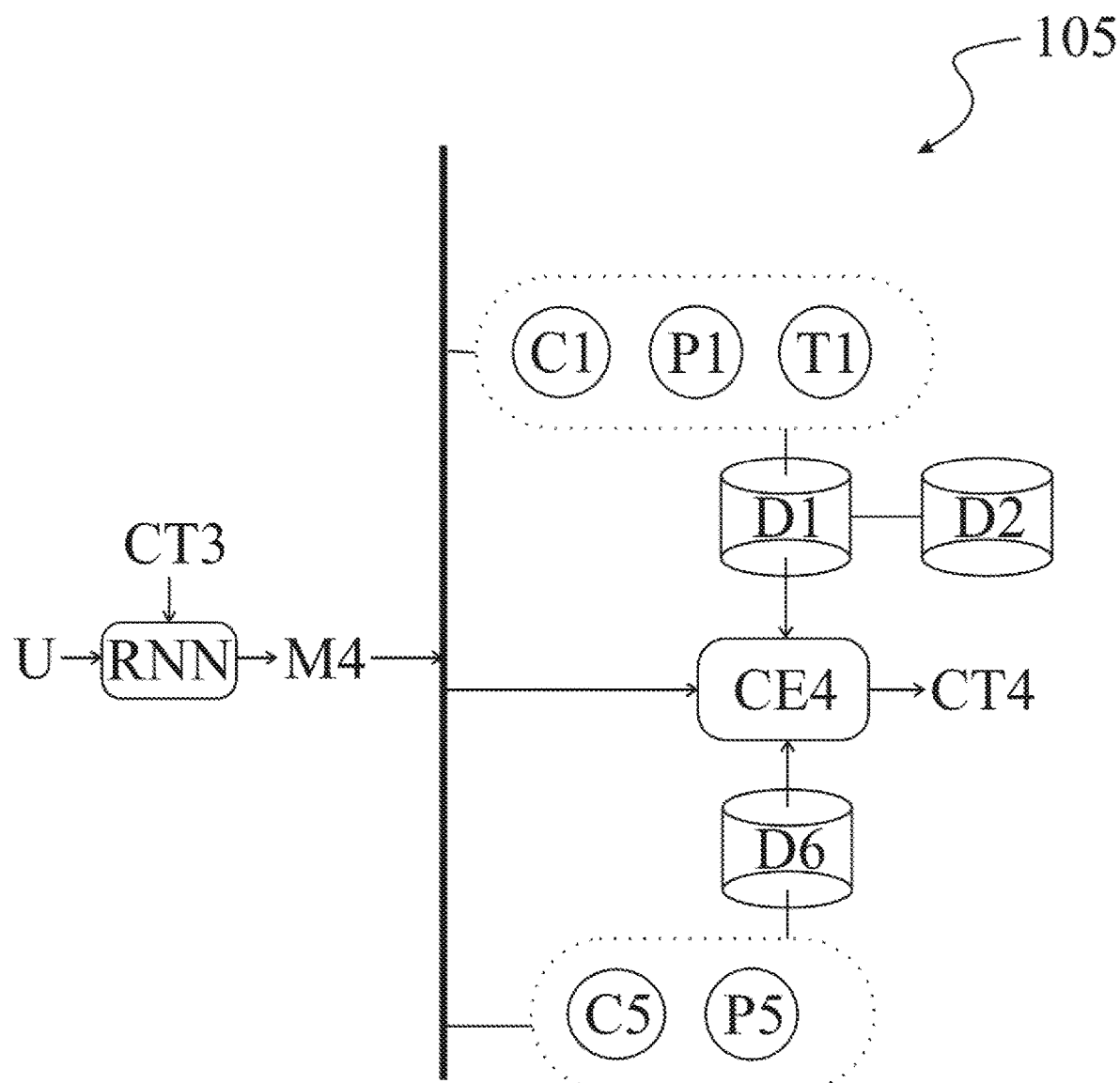

FIG. 5 illustrates a fifth step (105) of the system and method of this invention. Its eventual use is also seen, as portion of a complete cycle, in FIG. 5 of the accompanying drawings.

In at least an embodiment, a reaction node (RNN) is configured to review a fourth set of markers (reaction markers) (M4) of the consumer (C); this fourth set of markers being reaction markers based on action based on consumption of the insight-reaction content (CT3).

In at least an embodiment, a fifth crawler (C5) and a fifth parser (P5) crawls through and parses through a stored (expert) content from the first database.

In at least an embodiment, a fourth correlative engine (CE4) is configured to correlate user-generated content with static (expert) content, of the first database, based on computed pertinence indicators and computed colliding score which is a function of outputs of said first tracker, said second tracker, and said third tracker; along with correlating meta-tags of said static (expert) content and meta-tags of said user-generated content in order to output an interleaved or correlated dynamically formed new content set which is the above-defined "output content", at an output node (display), of a networked electronic device, for consumption. This dynamically formed new content is "second_situation-action content (CT4)".

Figure 6:
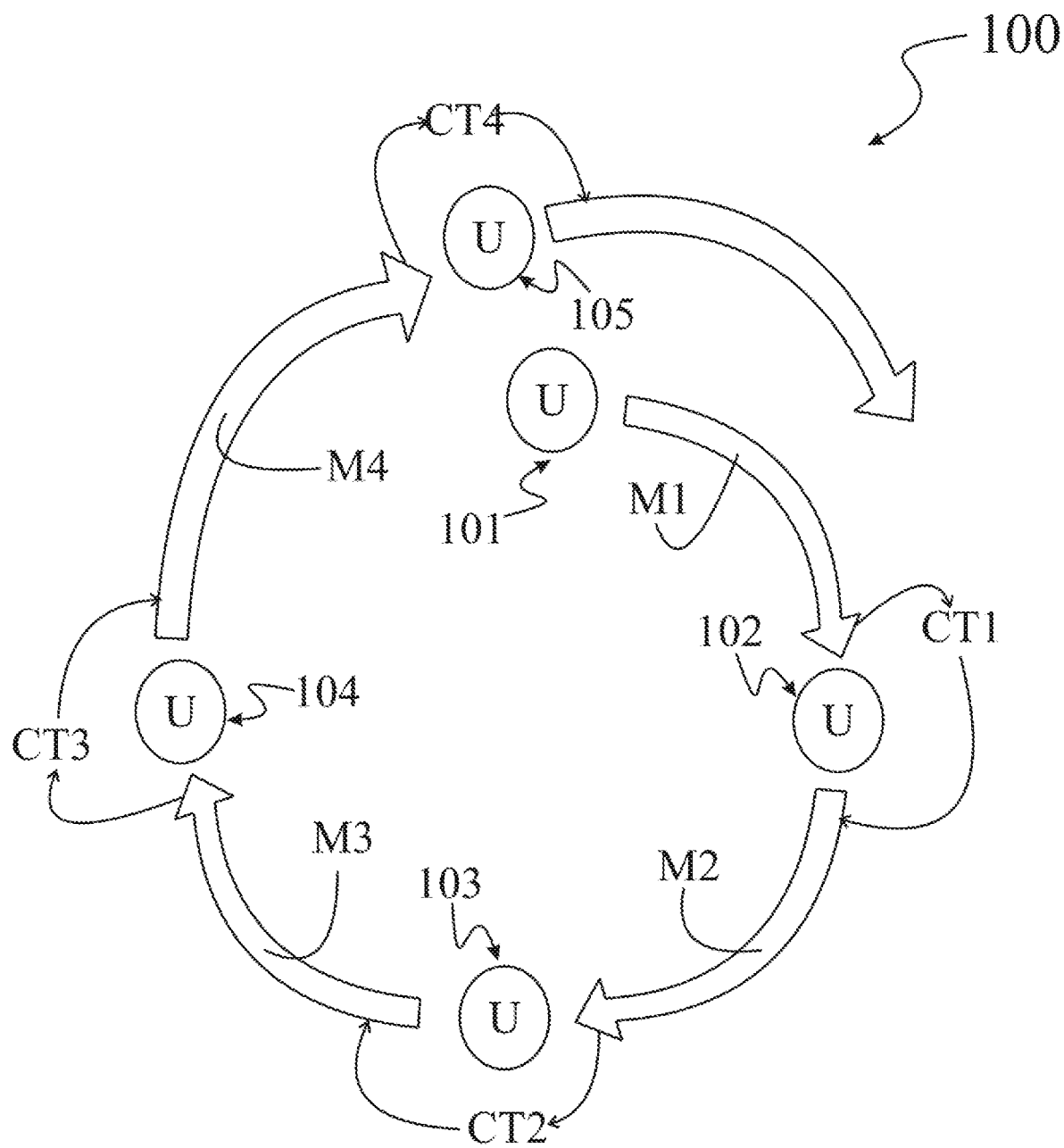
FIG. 6 illustrates a complete cycle, of causality, as technically enabled by the system and method of this invention.

FIG. 6 illustrates a complete cycle (100), of causality, as technically enabled by the system and method of this invention.

This causal loop forms the basis of repeatable measurement of causality. This causality can be defined by at least the following method:
effecting an action item, via content, in response to a consumer's (U) first situation, via content, by measuring a first set of markers (base markers) (M1), in order to provide a "first_situation-action content (CT1)";
effecting an insight item, via content, in response to a consumer's (U) action, via content, by measuring a second set of markers (action markers) (M2), in order to provide an "action-insight content (CT2)";
effecting a reaction item, via content, in response to a consumer's (U) insight, by measuring a third set of markers (insight markers) (M3), in order to provide an "insight-reaction content (CT3)" (or an "insight-second_situation content")—this reaction being a second (new) situation;
effecting another (new and/or subsequent) action item, via content, in response to a consumer's (U) second situation, via content, by measuring a fourth set of markers (reaction markers) (M4), in order to provide a "second_situation-action content (CT4)".

Figure 8:
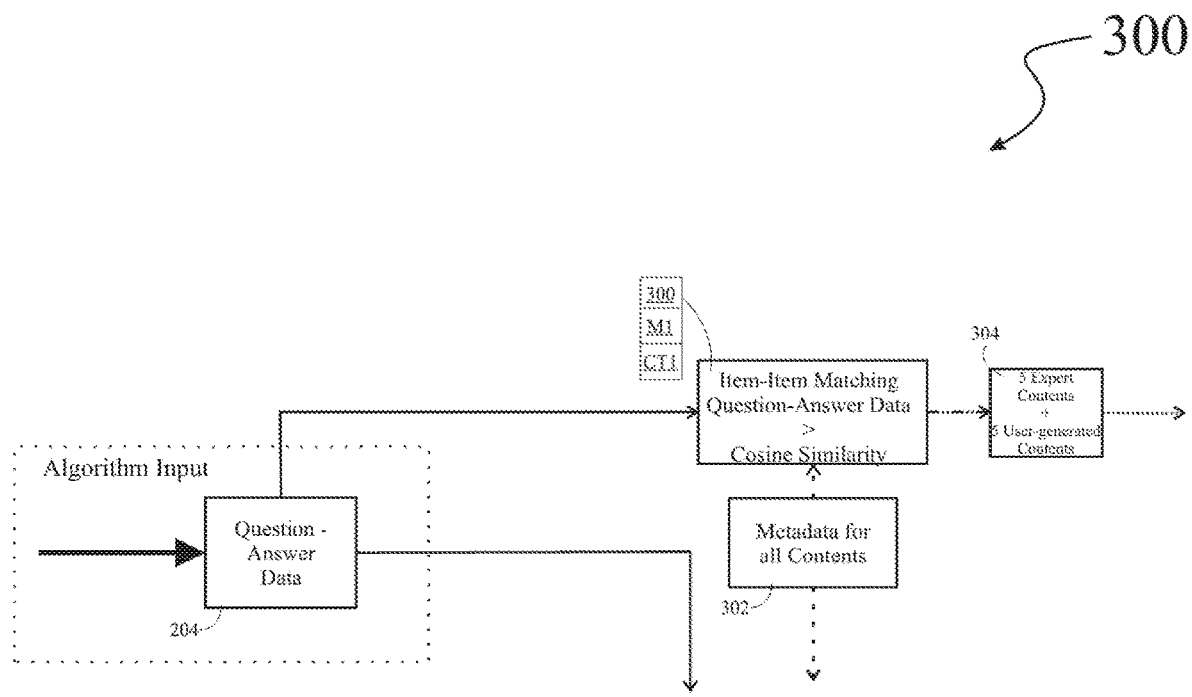
FIG. 8 illustrates a portion of the network architecture, of FIG. 7B, showing how the system and method of this invention performs (content) item to content (item) matching.

FIG. 8 illustrates a portion (300) of the network architecture, of FIG. 7B, showing how the system and method of this invention performs (content) item to content (item) matching.

The purpose of this "(content) item to content (item) matching" algorithm is to identify content items that are relevant/correlative to a user's dynamic input data without considering user's static input data, thereby using the user's base markers (M1). In this 'algorithm', only the dynamic input data (204) is considered. Static input data (202) is not considered in this phase. Content meta-tags (302), i.e. static meta-tags and dynamic meta-tags, are used as a static input for this algorithm (300). Each content item is represented as a featured vectorised form using term frequency-inverse document frequency (TFIDF) method. Using this information, a trained model is built that represents each content in its vector form. This model is used for real-time predictions. Separate models are built for expert content(s) and for user-generated content(s). Once the dynamic input data, from the user, is obtained, it is converted into a featured vectorized form using the TFIDF method. One the dynamic input data vector is obtained, distances between dynamic input data vector and content vectors, from trained models, are calculated (300) using cosine similarity. Using this data, a set of expert content items and a set of user-generated content items is provided as a correlative output (304).

Figure 9:
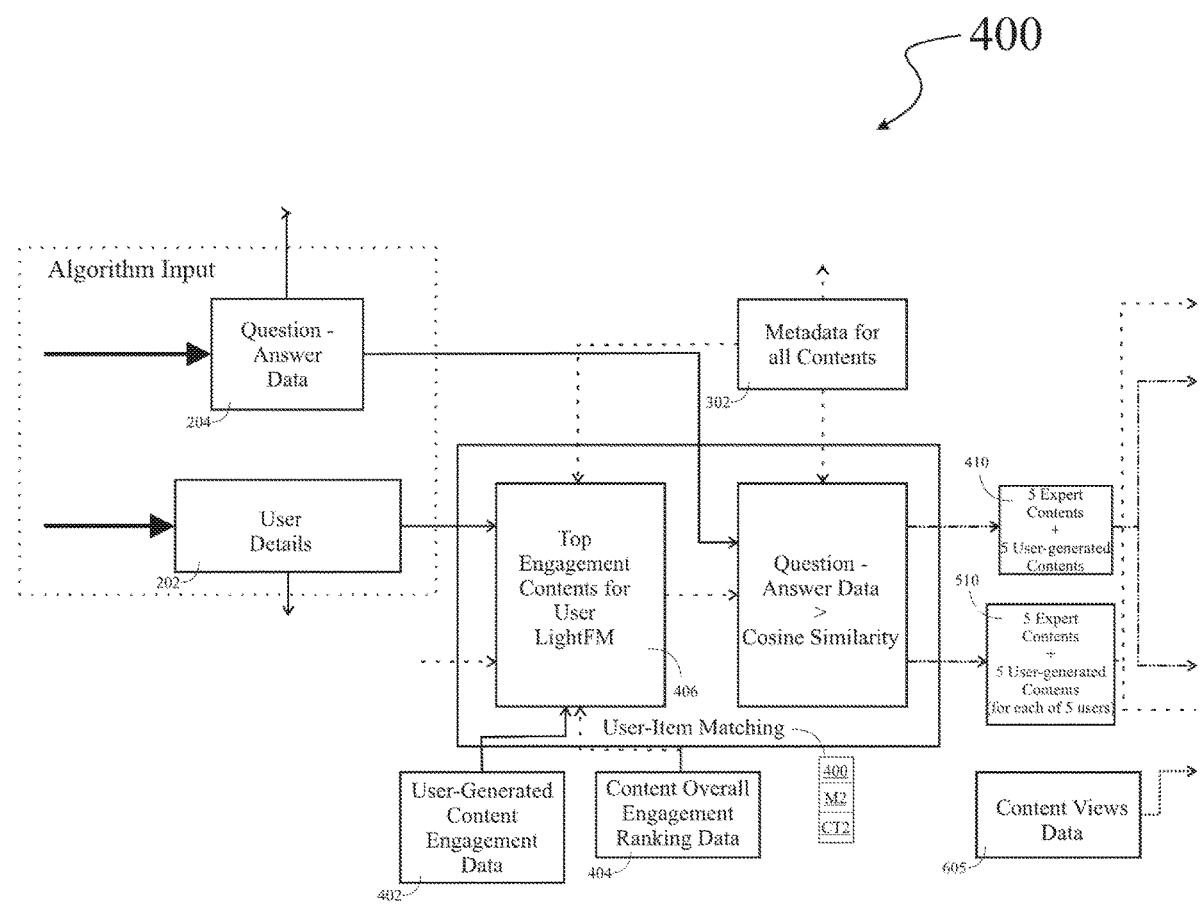
FIG. 9 illustrates a portion of the network architecture, of FIG. 7B, showing how the system and method of this invention performs a user (i.e. consumer of content) to content (item) matching.

FIG. 9 illustrates a portion (400) of the network architecture, of FIG. 7B, showing how the system and method of this invention performs a user (i.e. consumer of content) to content (item) matching.

The purpose of this "user (i.e. consumer of content) to content (item) matching" algorithm is to identify content items that are relevant/correlative to a user's action markers (M2) and the user's insight markers (M3). In this 'algorithm', inputs from dynamic input data (204) as well as from static input data (202) are considered. In this algorithm, a user-generated content engagement matrix (402) and a content metadata matrix (404), representing content's engagement, content's popularity, and/or content's relevance, are built. Both these matrices (402, 404) are used to train a LightFM model (406); a first LightFM model for expert content and a second LightFM model for user-generated content. User's static input data (202) is passed to the LightFM model (406) as another input. This LightFM model (406), then, compares the static input data (202) with the matrices (402, 404) and provides a set of content items that are relevant to the user, by looking at the user's previous engagement pattern. Once the list of relevant content items is identified, they are passed to the 'content (item) to content (item) matching algorithm' in order to identify a set of content items that are relevant to the dynamic data input (204).

In this portion (400) of the algorithm, content engagement data, content rating data as static Input, and user's static input, user's dynamic input; are all used. A matrix is created for every user-content combination, by looking at a plurality (e.g. five) of user-engagement parameters with the content item. Each of these parameters are represented in numeric values (count), and correlates with the following:
whether user has viewed a content item;
whether user has liked the content item;
whether user has rated the content item and user's rating for the content item (available only for expert content items);
whether user has added comments on the content item;
whether user has shared the content item with other users.

Each parameter is given a specific weightage as mentioned below:
view_weight=1
rate_weight=1.2
like_weight=1.4
comment_weight=1.6
share_weight=1.8

The weightage is decided based on efforts required to perform the activity, mentioned above, and how it relates to usefulness of the content item.

Final weightage, of each engagement parameter, is calculated by multiplying the count with its corresponding weight.

View_val=view_count*view_weight
Like_val=like_count*like_weight
Rate_val=rate_count*rate_weight
Comment_val=comment_count*comment_weight
Share_val=share_count*share_weight Final user-generated content interaction (Final-Rate-Value) is calculated using formula stated below:

For user-generated content:

Final-Rate-Value=View_val+Like_val+Comment_val+Share_val

For expert content:

Final-Rate-Value=View_val+Like_val+Rate_val+Comment_val+Share_val

After the Final-Rate-Value is obtained for each user-tool combination, a User-content Interaction matrix is built, as seen below:

TABLE 1

User-generated Content Interaction Matrix

|  | Content ID 1 | Content ID 2 | ... | Content ID N |
|---|---|---|---|---|
| User ID 1 | Final-Rate-Value 1 | Final-Rate-Value 2 | ... | Final-Rate-Value 4 |
| User ID 2 | Final-Rate-Value 5 | Final-Rate-Value 6 | ... | Final-Rate-Value 8 |
| ... | Final-Rate-Value 9 | Final-Rate-Value 10 | ... | Final-Rate-Value 12 |
| User ID N | Final-Rate-Value N-x | Final-Rate-Value N-y | ... | Final-Rate-Value N |

This matrix is generated separately for user-generated content and for expert content.

A separate content feature matrix is calculated by looking at the overall interaction data for each content item and the content. For the purpose of this matrix, the text is converted into its numerical representation using the TFIDF method mentioned in the content (item) to content (item) matching algorithm, mentioned above.

A separate matrix is generated for expert content and for user-generated content.

TABLE 2

Content Feature Matrix (for expert content)

|  | View count | Share count | Comment count | Like count | Avg. Rating | Text (vector) |
|---|---|---|---|---|---|---|
| Content ID 1 | Value | Value | Value | Value | Value | Value |
| Content ID 2 | Value | Value | Value | Value | Value | Value |
| ... |  |  |  |  |  |  |
| Content ID N | Value | Value | Value | Value | Value | Value |

TABLE 3

Content Feature Matrix (for user-generated content)

|  | View count | Share count | Comment count | Like count | Text (vector) |
|---|---|---|---|---|---|
| Content ID 1 | Value | Value | Value | Value | Value |
| Content ID 2 | Value | Value | Value | Value | Value |
| ... |  |  |  |  |  |
| Content ID N | Value | Value | Value | Value | Value |

Once both the matrices are populated, they are then passed to LightFM model (406). LightFM is a hybrid matrix factorisation model representing users and items as linear combinations of their content features' latent factors. The model outperforms both collaborative and content-based models in cold-start or sparse interaction data scenarios (using both user and item meta-tag), and performs at least as well as a pure collaborative matrix factorisation model where interaction data is abundant. This trained LightFM model is then used for real-time predictions. When a user's static input (user identity, in this case) is obtained, it is passed to the trained model. The model, in response, returns the content items that are relevant to user. This set of content items is then passed as input to the "content (item) to content (item) matching algorithm" (200). The other input for the "content (item) to content (item) matching algorithm" (200) is the static input data (202). The model then returns set of expert content items and a set of user-generated content items is provided as a correlative output (410), that are relevant to the user and the context of user's answer vide dynamic data input (204).

Figure 10:
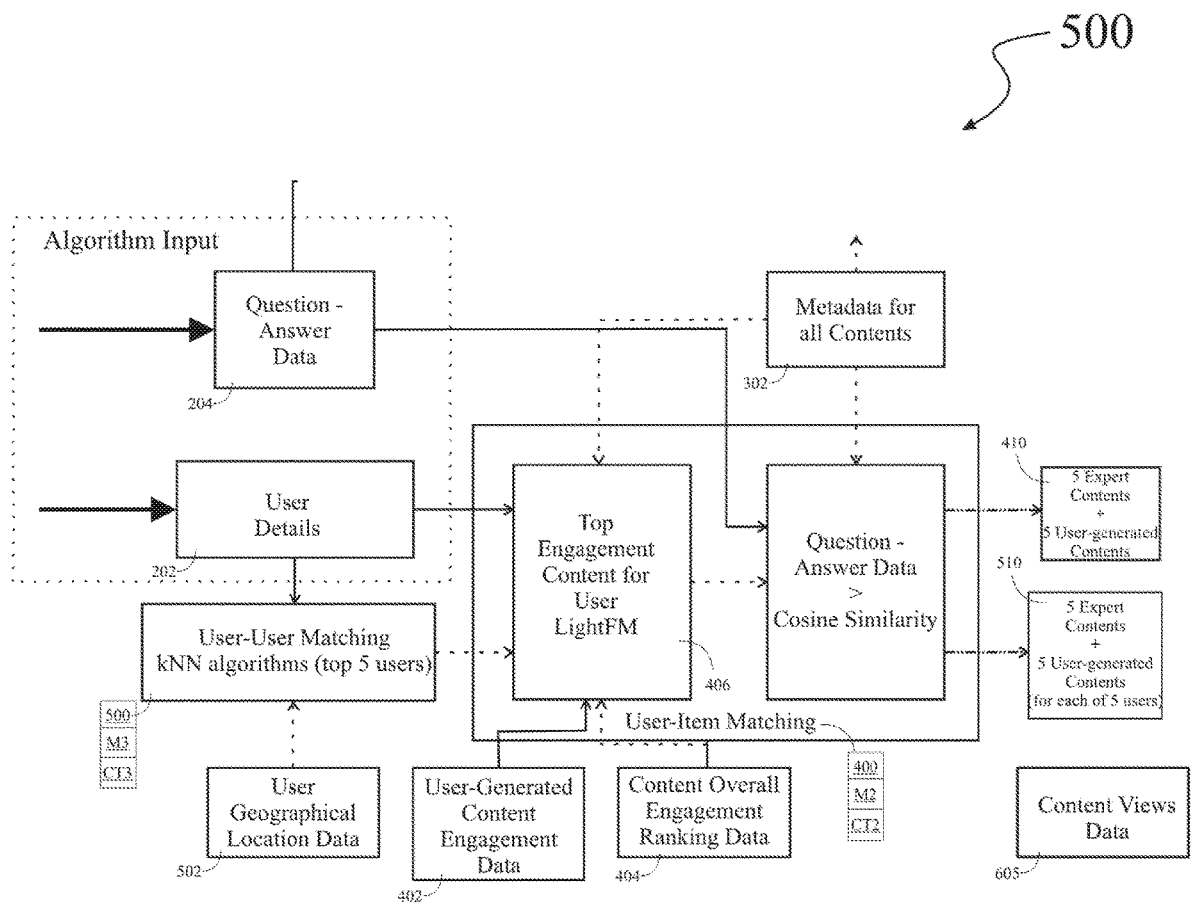
FIG. 10 illustrates a portion of the network architecture, of FIG. 7B, showing how the system and method of this invention performs a user (i.e. consumer of content) to user matching.

FIG. 10 illustrates a portion (500) of the network architecture, of FIG. 7B, showing how the system and method of this invention performs a user (i.e. consumer of content) to user matching.

The purpose of this "user (i.e. consumer of content) to content (item) matching" algorithm is to identify content items that are relevant/correlative to a user's reaction markers (M3) along with other user's base markers (M4).

In at least a non-liming exemplary embodiment, user's geographical location (502) is used as one of the parameters and a "pertinence indicator" along with "colliding score" is considered as another parameter. Users that have the same pertinence indicator or 1 or 2 degrees spaced apart are relevant. This forms the boundaries of edge learning network. According to this non-limiting exemplary embodiment, only geographical location data, as an attribute, is considered. In order to identify user that are within the scope defined by this system and method, using the "pertinence indicator" along with "colliding score", kNN (k-Nearest Neighbours) machine learning algorithm is used. Once relevant users are identified, they are passed to the "user (i.e. consumer of content) to content (item) matching" algorithm, as described above, in order to identify matching user-generated content and matching expert content.

In at least an embodiment, all users' static input data, all users' pertinence indicators, and all users' colliding scores; all are used as a static input for this a "user (i.e. consumer of content) to user matching" algorithm. In this algorithm, K-Nearest Neighbour algorithm, is used, for finding the most similar users based only on geographic data (as an attribute). For a non-limiting exemplary embodiment, "k" value is set to 5. In the kNN algorithm, distances for a given user and all other users are calculated using a custom distance function of location giving first priority to exact matching location. Second priority is given to users with the same country, same region and different city. After that, users with only matching country and different region and city are recommended. If there are no users from the same country, users from different countries are recommended. If the vertical level of the user is not present in the user data, the system recommends 5 users based on only location data. If the vertical level for user is present in data, then:

a. If more than 5 users have the same location and that match pertinence indicators, then recommend first 5 users; or b. If less than 5 users have the same location & that match VMI criteria, then recommend the matching users first and then recommend users that match pertinence indicators and finally recommend users from similar geography; or c. If none of the users have the same location and match pertinence indicators criteria, then recommend the first 3 users based only on the pertinence indicators criteria and 2 users based only on the location data.

Once the 5 users are identified, the system then pass them to "user (i.e. consumer of content) to content (item) matching" algorithm in order to identify content items matching on the basis of engagement data.

At the end of "user (i.e. consumer of content) to user matching" algorithm, the system provides an output (510) of a set (25, in this case) of expert content items and a set (25, in this case of user-generated content items, recommended, that match both the users and the context.

Figure 11:
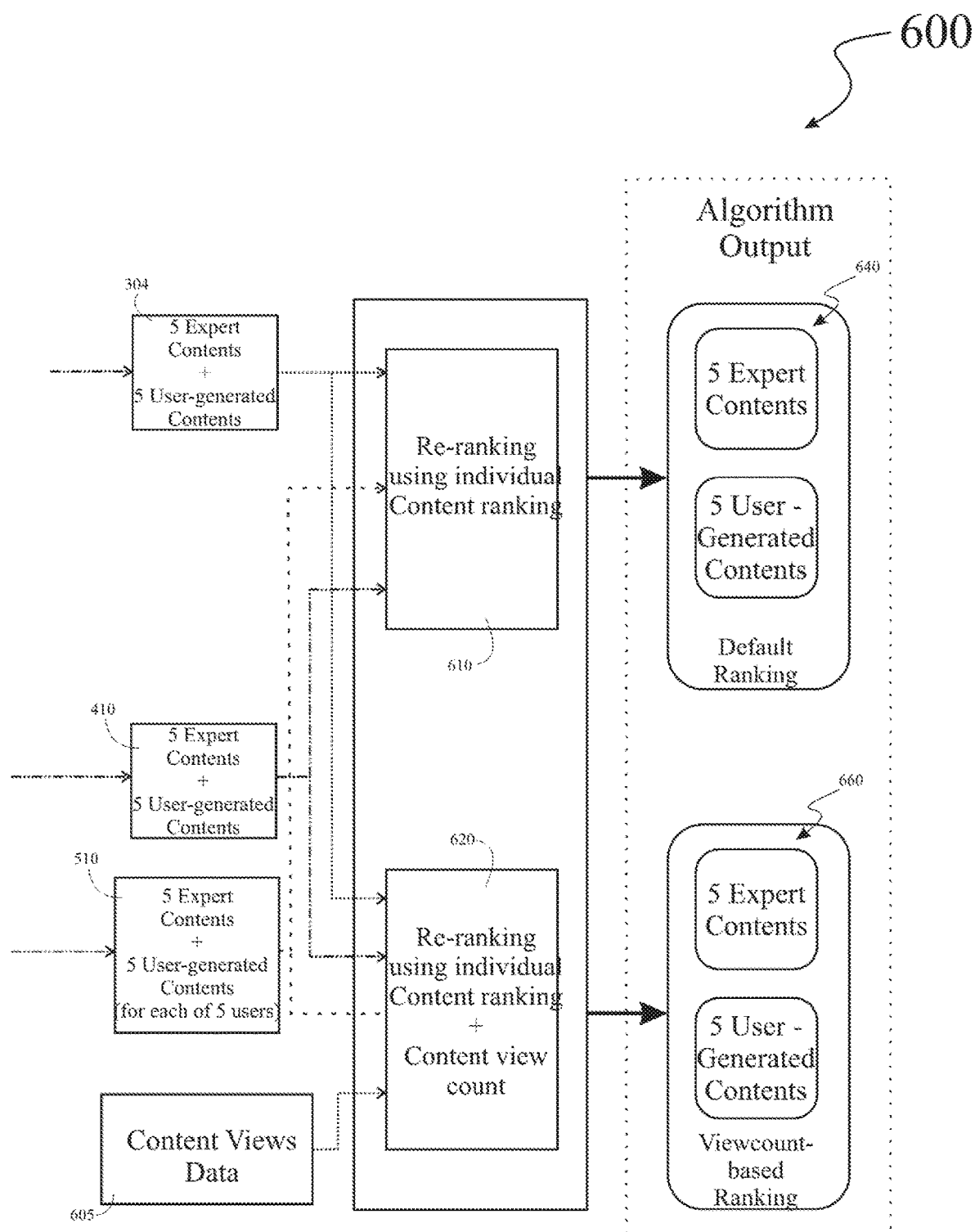
FIG. 11 illustrates a portion of the network architecture, of FIG. 7B, showing how ranking of content (expert content and/or user-generated content) is done, by the system and method of this invention, for consumption of further context-based content.

FIG. 11 illustrates a portion (600) of the network architecture, of FIG. 7B, showing how ranking of content (expert content and/or user-generated content) is done, by the system and method of this invention, for consumption of further context-based content.

The purpose of this ranking algorithm is to determine an output content based on output of the "(content) item to content (item) matching" algorithm [FIG. 8], the "user (i.e. consumer of content) to content (item) matching" algorithm [FIG. 9], and the "user (i.e. consumer of content) to content (item) matching" algorithm [FIG. 10].

In at least an embodiment, the ranking algorithm (600) comprises at least two separate pieces of logic; a first logic (610) that generates results based only on matching percentage provided by previous algorithms, and a second logic (62) that uses matching percentage and the popularity of the content items. In order to identify popularity of a content item, the ranking algorithm (600) uses view count (605) of each content item. The assumption over here is that more the content item is viewed, the more popular it is.

In at least an embodiment, according to a non-limiting exemplary embodiment, a set (say, 5 numbers) of content items (304) from (content) item to content (item) matching algorithm, a set (say, 5 numbers) of content items (410) from a user (i.e. consumer of content) to user matching algorithm, and a set (say, 25 numbers) from a user (i.e. consumer of content) to content (item) matching algorithm; all are used as input for the ranking algorithm (600). Each content item has a matching percentage assigned by its respective algorithm (from where it was output). This percentage value represents how closely the context of the content item matches with the user's dynamic data input (204). In the ranking algorithm, the system arranges context items from each algorithm (300, 400, 500) in descending order of their matching percentage.

In the first logic (610) i.e. the "Re-ranking using Individual content item ranking" method, the system takes top 40% of the content items recommended by (content) item to content (item) matching algorithm (200), 40% of the content items recommended by a user (i.e. consumer of content) to user matching algorithm (300), and 20% of the content items recommended by a user (i.e. consumer of content) to content (item) matching algorithm (500); and generates a final set (640) of expert content items (say, 5 numbers) and correlative user-generated content items (say, 5 numbers).

In the second logic (620) i.e. the "Re-ranking using Individual content item ranking+content item view count" method, the system first identifies the view count (number of views) for each content item that is recommended from three algorithms ((content) item to content (item) matching algorithm (300), a user (i.e. consumer of content) to user matching algorithm (400), a user (i.e. consumer of content) to content (item) matching algorithm (500)) and re-arranges them based on view count (highest on top). After this, the system apply the same logic mentioned, above, in order to generates a final set (660) of expert content items (say, 5 numbers) and correlative user-generated content items (say, 5 numbers).

The final output content is represented by reference numerals 640 and 660.

Figure 12:
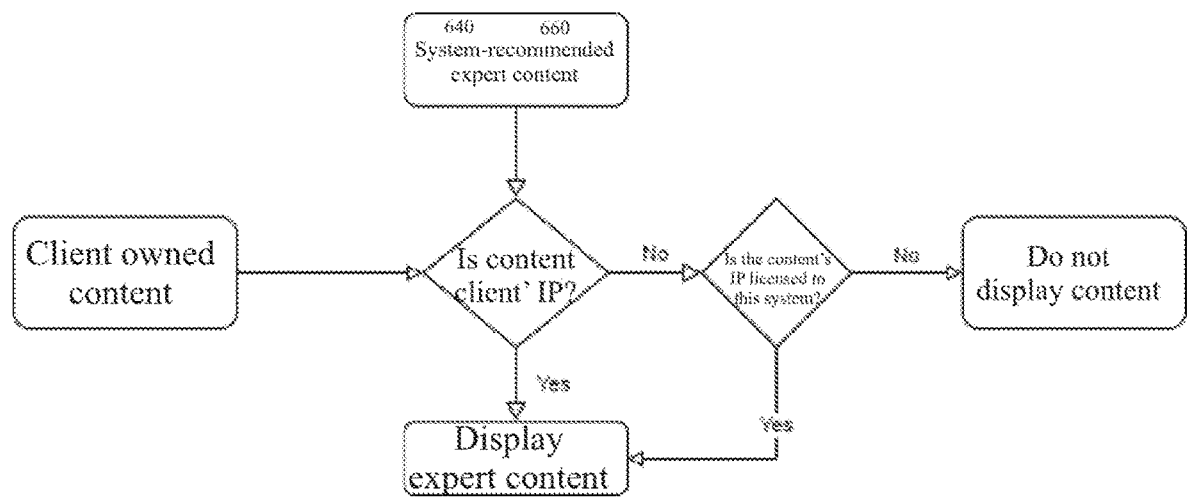
FIG. 12 illustrates a flowchart indicating a Digital Rights' Management module, for expert content, incorporated in the network architecture of FIG. 7B of this system and method.

FIG. 12 illustrates a flowchart indicating a Digital Rights' Management module (DRM module), for expert content, incorporated in the network architecture of FIG. 7B of this system and method.

It is to be understood that 'expert content' is a particular user's (not this system's) intellectual property. Hence, they cannot be distributed to other users without owner's consent. User-generated content items are created by end-users. Hence, without their consent, these content items cannot be made available to other users (even within the same organization). In order to handle these restrictions, a DRM module is used in order to identify which output content can be made available to a consuming user. The accompanying flowchart shows steps that the system and method of this invention follows the output content items are recommended.

In case of expert content items, the system first checks if the consuming user belongs to the same client that created the expert content items and only then displays the content item.

Figure 13:
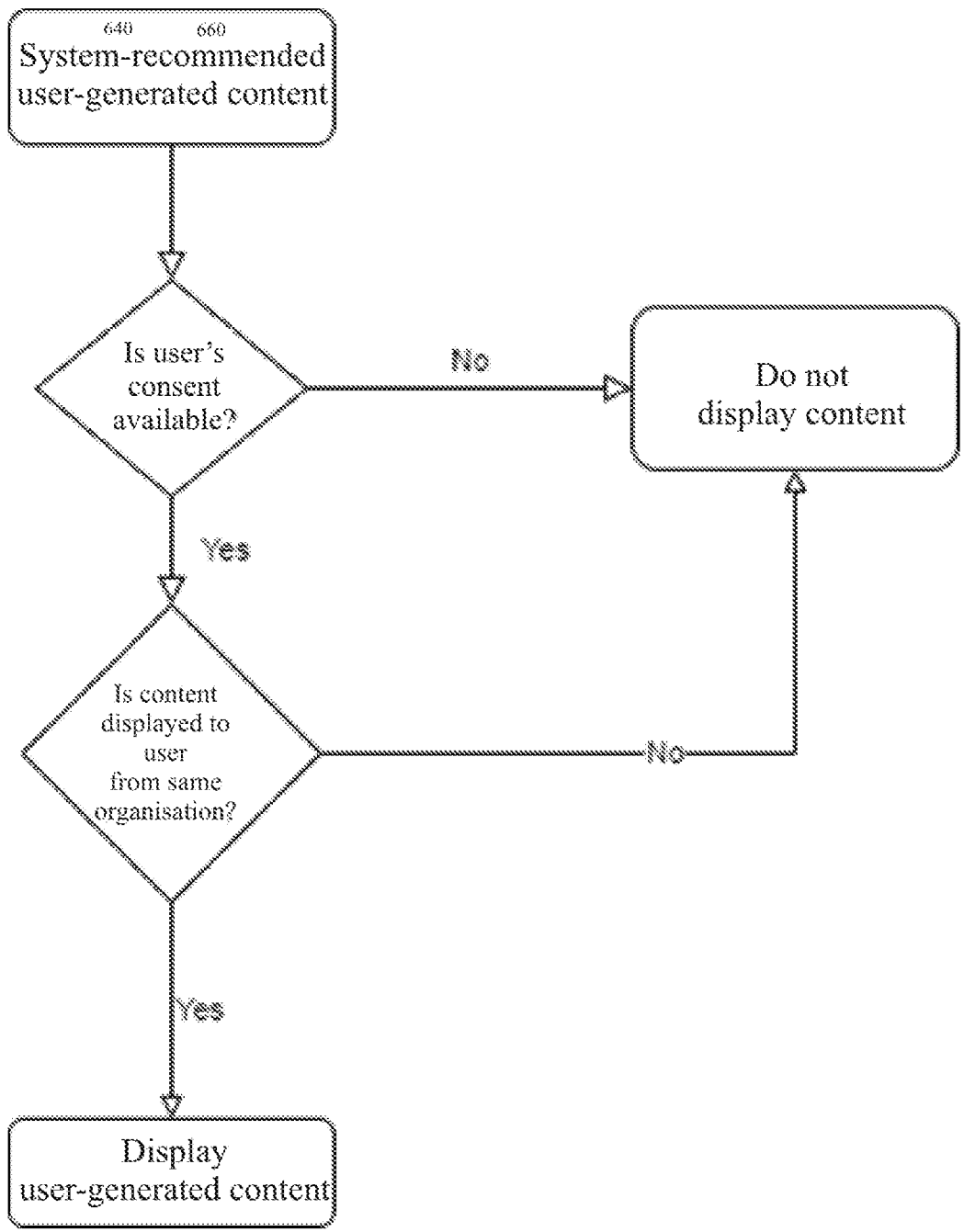
FIG. 13 illustrates a flowchart indicating a Digital Rights' Management module, for user-generated content, incorporated in the network architecture of FIG. 7B of this system and method.

FIG. 13 illustrates a flowchart indicating a Digital Rights' Management module (DRM module), for user-generated content, incorporated in the network architecture of FIG. 7B of this system and method.

In case of use-generated content items, the system and method, of this invention, first checks if the user who created the content item has agreed to sharing it with other users. If yes, then the system and method of this invention checks whether the user who is going to consume the content item belongs to the same organization, and only then displays the user-generated content item.

The TECHNICAL ADVANCEMENT of this invention lies in providing an iterative feedback based system and method to allow a user to not only consume content in a pertinent fashion, but, to auto-generate context-based content (in a stitched manner from static existing content along with dynamic user-generated content) in a dynamic and personalized manner, thereby allow a user to navigate through the labyrinth of static content and user-generated content.

While this detailed description has disclosed certain specific embodiments for illustrative purposes, various modifications will be apparent to those skilled in the art which do not constitute departures from the spirit and scope of the invention as defined in the following claims, and it is to be distinctly understood that the foregoing descriptive matter is to be interpreted merely as illustrative of the invention and not as a limitation.

The invention claimed is:

1. A computer-implemented method, caused by a server, for hierarchical causality-based stitching of content and for serving said stitched content as output content, said method comprising:

tracking, and measuring, a first set of markers, for at least a first content consumer, consuming at least a first content item, from a first content set, on networked corresponding electronic devices;

presenting, to said first content consumer, said first set of markers being static input data;

tracking, and measuring, a first set of markers, for at least a second content consumer, consuming at least a second content item, from a second content set, on networked corresponding electronic devices;

receiving, by said first content consumer, a request corresponding to at least a marker from said first set of markers, said request being dynamic input data;

computing at least a pertinence indicator by correlating meta-tags of said first content and said second content to determine correlativeness between said first content and said second content according to pre-defined rules of correlation;

computing at least a colliding score by checking if said tracked and measured first set of markers of said first content consumer are within a pre-determined threshold of said tracked and measured first set of markers of said second content consumer;

verifying if said colliding score of a first user and a second user is within said pre-determined threshold;

searching for another second user consuming said second content if said colliding score is not within said pre-determined threshold;

automatically collating said at least a first content item, correlative to said first user, and at least a second content item, correlative to said second user, to form at least an output content, if said pertinence indicator is within said pre-defined rules of correlation and if said colliding score is within said pre-determined threshold;

serving said collated output content, to said first content consumer, on said networked corresponding consumer electronic devices; and user to content matching, by,
      receiving static input data of said first user,
      receiving dynamic input data of said first user,
      generating a second content engagement matrix and a correlative second content's meta-tags matrix, each of said matrices representing said second content's engagement with a user, content's popularity, and/or content's relevance,
      using said second content engagement matrix and said correlative second content's meta-tags matrix to train corresponding hybrid matrix factorisation models, in that, a first hybrid matrix factorisation model being generated for said first content and a second hybrid matrix factorisation model being generated for said second content, and
      comparing said first user's static input data with each of said matrices in order to collate a set of content items relevant to said first user.

2. The method as claimed in claim 1 wherein, said first content item is a content item selected from expert content.

3. The method as claimed in claim 1 wherein, said second content item is a content item selected from user-generated content.

4. The method as claimed in claim 1 wherein, said method comprising at least a step of matching item to content, said step comprising further steps of:

receiving meta-tags correlative to tracked and measured said first content being consumed by said first user;
   representing each tracked and measured said first content as a first featured vectorised form using term frequency-inverse document frequency method;
   receiving meta-tags correlative to tracked and measured said second content being consumed by said second user;
   representing each tracked and measured said second content as a second featured vectorised form using term frequency-inverse document frequency method; and
   computing pertinence indicator for matching item to item as a function of distances, between said first featured vectorised form and said second featured vectorised form, correlative to said dynamic input data vector.

5. The method as claimed in claim 1 wherein, said method comprising at least a step of user to content matching, said step comprising further steps of:

generating a matrix for each first user and their corresponding consumed content's engagement parameters;
   providing a weightage to each engagement parameter based on tracked and measured data of said first user's engagement with said first content;
   providing a weightage to each engagement parameter based on tracked and measured data of said second user's engagement with said second content;
   generating a first content interaction rating as a function of each user's and its corresponding content's engagement parameters and associated weightage;
   generating a second content interaction rating as a function of each user's and its corresponding content's engagement parameters and associated weightage;
   generating a first content feature matrix as a function of said generated first content interaction rating;
   generating a second feature interaction matrix as a function of said generated second content interaction rating;
   using said generated first content feature matrix to train a corresponding first hybrid matrix factorisation model;
   using said generated second content feature matrix to train a corresponding second hybrid matrix factorisation model; and
   using said trained first hybrid matrix factorisation model and said second hybrid matrix factorisation model, along with static data input and dynamic data input, in order to collate a set of first content and second content relevant to said first user's static data input and dynamic data input.

6. The method as claimed in claim 1 wherein, said method comprising at least a step of a user to user matching, said step comprising further steps of:

computing colliding score for matching a first user and a second user, based on a pre-defined threshold, determined by comparing at least an attribute indicated by a first set of markers of said first user with at least the same attribute indicated by a first set of markers of said second user.

7. The method as claimed in claim 1 wherein, said step of serving comprising a step of verifying licensing rights of said first content before serving said first content.

8. The method as claimed in claim 1 wherein, said step of serving comprising a step of verifying licensing rights of said second content before serving said first content.

9. A computer-implemented method, caused by a server, for hierarchical causality-based stitching of content and for serving said stitched content as output content, said method comprising:
- tracking, and measuring, a first set of markers, for at least a content consumer, consuming at least a first content item, from a first content set, on networked corresponding electronic devices;
- presenting, to said content consumer, said first set of markers being static input data;
- receiving, by said content consumer, a request corresponding to at least a marker from said first set of markers, said request being dynamic input data;
- automatically collating, said at least a first content item, from said first content set, and at least a second content item, from a second content set, in response to said request, to form at least a first situation-action content item;
- tracking, and measuring, a second set of markers, for said at least a content consumer, consuming at least said first situation-action content;
- presenting, to said content consumer, said second set of markers;
- receiving, by said content consumer, a review request corresponding to at least a marker from said second set of markers;
- automatically collating, said at least a first content item, from said first content set, and at least a third content item, from a third content set, in order to said review request, to form at least an action-insight content item;
- tracking, and measuring, a third set of markers, for said at least a content consumer, consuming at least said action-insight content;
- presenting, to said content consumer, said third set of markers;
- receiving, by said content consumer, a reaction corresponding to at least a marker from said third set of markers;
- automatically collating said at least a first content item, from said first content set, and at least a third content item, from a fourth content set, to form at least an insight-reaction content;
- tracking, and measuring, a fourth set of markers, for said at least a content consumer, consuming at least said insight-reaction content item;
- presenting, to said content consumer, said fourth set of markers;
- receiving, by said content consumer, a review request corresponding to said fourth set of markers;
- automatically collating said at least a first content item, from said first content set, and at least a second content item, from said second content set, to form at least a second situation-action content;
- serving said formed at least a second situation-action content, as an output content, to said content consumer on said networked corresponding consumer electronic devices; and
- user to content matching, by,
  - receiving static input data of a first user,
  - receiving dynamic input data of said first user,
  - generating a second content engagement matrix and a correlative second content's meta-tags matrix, each of said matrices representing said second content's engagement with a user, content's popularity, and/or content's relevance,
  - using said second content engagement matrix and said correlative second content's meta-tags matrix to train corresponding hybrid matrix factorisation models, in that, a first hybrid matrix factorisation model being generated for said first content and a second hybrid matrix factorisation model being generated for said second content, and
  - comparing said first user's static input data with each of said matrices in order to collate a set of content items relevant to said first user.

10. The method as claimed in claim 9 wherein, said first content item is a content item selected from expert content.

11. The method as claimed in claim 9 wherein, said second content item is a content item selected from user-generated content.

12. The method as claimed in claim 9 wherein, each of said steps of tracking and measuring comprising at least a step of tracking and measuring expert content.

13. The method as claimed in claim 9 wherein, each of said steps of tracking and measuring comprising at least a step of tracking and measuring user-generated content.

14. The method as claimed in claim 9 wherein, said method comprising at least a step of matching item to content, said step comprising further steps of:
- receiving meta-tags correlative to tracked and measured said first content being consumed by said first user;
- representing each tracked and measured said first content as a first featured vectorised form using term frequency-inverse document frequency method;
- receiving meta-tags correlative to tracked and measured said second content being consumed by said second user;
- representing each tracked and measured said second content as a second featured vectorised form using term frequency-inverse document frequency method; and
- computing pertinence indicator for matching item to item as a function of distances, between said first featured vectorised form and said second featured vectorised form, correlative to said dynamic input data vector.

15. The method as claimed in claim 9 wherein, said method comprising at least a step of user to content matching, said step comprising further steps of:
- generating a matrix for each first user and their corresponding consumed content's engagement parameters;
- providing a weightage to each engagement parameter based on tracked and measured data of said first user's engagement with said first content;
- providing a weightage to each engagement parameter based on tracked and measured data of said second user's engagement with said second content;
- generating a first content interaction rating as a function of each user's and its corresponding content's engagement parameters and associated weightage;
- generating a second content interaction rating as a function of each user's and its corresponding content's engagement parameters and associated weightage;
- generating a first content feature matrix as a function of said generated first content interaction rating;
- generating a second feature interaction matrix as a function of said generated second content interaction rating;
- using said generated first content feature matrix to train a corresponding first hybrid matrix factorisation model;

using said generated second content feature matrix to train a corresponding second hybrid matrix factorisation model; and using said trained first hybrid matrix factorisation model and said second hybrid matrix factorisation model, along with static data input and dynamic data input, in order to collate a set of first content and second content relevant to said first user's static data input and dynamic data input.

16. The method as claimed in claim 9 wherein, said method comprising at least a step of a user to user matching, said step comprising further steps of:

computing colliding score for matching a first user and a second user, based on a pre-defined threshold, determined by comparing at least an attribute indicated by a first set of markers of said first user with at least the same attribute indicated by a first set of markers of said second user.

17. The method as claimed in claim 9 wherein, said step of serving comprising a step of verifying licensing rights of said first content before serving said first content.

18. The method as claimed in claim 9 wherein, said step of serving comprising a step of verifying licensing rights of said second content before serving said first content.

19. A system comprising:
one or more processors; and
a non-transitory computer-readable medium or media comprising one or more sequences of instructions which, when executed by at least one of the one or more processors, causes steps to be performed comprising:
  tracking, and measuring, a first set of markers, for at least a first content consumer, consuming at least a first content item, from a first content set, on networked corresponding electronic devices;
  presenting, to said first content consumer, said first set of markers being static input data;
  tracking, and measuring, a first set of markers, for at least a second content consumer, consuming at least a second content item, from a second content set, on networked corresponding electronic devices;
  receiving, by said first content consumer, a request corresponding to at least a marker from said first set of markers, said request being dynamic input data;
  computing at least a pertinence indicator by correlating meta-tags of said first content and said second content to determine correlative ness between said first content and said second content according to pre-defined rules of correlation;
  computing at least a colliding score by checking if said tracked and measured first set of markers of said first content consumer are within a pre-determined threshold of said tracked and measured first set of markers of said second content consumer;
  verifying if said colliding score of a first user and a second user is within said pre-determined threshold;
  searching for another second user consuming said second content if said colliding score is not within said pre-determined threshold
  automatically collating said at least a first content item, correlative to said first user, and at least a second content item, correlative to said second user, to form at least an output content, if said pertinence indicator is within said pre-defined rules of correlation and if said colliding score is within said pre-determined threshold;
  serving said collated output content, to said first content consumer, on said networked corresponding consumer electronic devices; and
user to content matching, by,
  receiving static input data of said first user,
  receiving dynamic input data of said first user,
  generating a second content engagement matrix and a correlative second content's meta-tags matrix, each of said matrices representing said second content's engagement with a user, content's popularity, and/or content's relevance,
  using said second content engagement matrix and said correlative second content's meta-tags matrix to train corresponding hybrid matrix factorisation models, in that, a first hybrid matrix factorisation model being generated for said first content and a second hybrid matrix factorisation model being generated for said second content, and
  comparing said first user's static input data with each of said matrices in order to collate a set of content items relevant to said first user.

20. The method as claimed in claim 19 wherein, said first content item is a content item selected from expert content.

21. The method as claimed in claim 19 wherein, said second content item is a content item selected from user-generated content.

22. A system comprising:
one or more processors; and
a non-transitory computer-readable medium or media comprising one or more sequences of instructions which, when executed by at least one of the one or more processors, causes steps to be performed comprising:
  tracking, and measuring, a first set of markers, for at least a content consumer, consuming at least a first content item, from a first content set, on networked corresponding electronic devices;
  presenting, to said content consumer, said first set of markers being static input data;
  receiving, by said content consumer, a request corresponding to at least a marker from said first set of markers, said request being dynamic input data;
  automatically collating, said at least a first content item, from said first content set, and at least a second content item, from a second content set, in response to said request, to form at least a first situation-action content item;
  tracking, and measuring, a second set of markers, for said at least a content consumer, consuming at least said first situation-action content;
  presenting, to said content consumer, said second set of markers;
  receiving, by said content consumer, a review request corresponding to at least a marker from said second set of markers;
  automatically collating, said at least a first content item, from said first content set, and at least a third content item, from a third content set, in order to said review request, to form at least an action-insight content item;
  tracking, and measuring, a third set of markers, for said at least a content consumer, consuming at least said action-insight content;
  presenting, to said content consumer, said third set of markers;
  receiving, by said content consumer, a reaction corresponding to at least a marker from said third set of markers;

automatically collating said at least a first content item, from said first content set, and at least a third content item, from a fourth content set, to form at least an insight-reaction content;

tracking, and measuring, a fourth set of markers, for said at least a content consumer, consuming at least said insight-reaction content item;

presenting, to said content consumer, said fourth set of markers;

receiving, by said content consumer, a review request corresponding to said fourth set of markers;

automatically collating said at least a first content item, from said first content set, and at least a second content item, from said second content set, to form at least a second situation-action content;

serving said formed at least a second situation-action content, as an output content, to said content consumer on said networked corresponding consumer electronic devices; and user to content matching, by,
    receiving static input data of a first user,
    receiving dynamic input data of said first user,
    generating a second content engagement matrix and a correlative second content's meta-tags matrix, each of said matrices representing said second content's engagement with a user, content's popularity, and/or content's relevance,
    using said second content engagement matrix and said correlative second content's meta-tags matrix to train corresponding hybrid matrix factorisation models, in that, a first hybrid matrix factorisation model being generated for said first content and a second hybrid matrix factorisation model being generated for said second content, and
    comparing said first user's static input data with each of said matrices in order to collate a set of content items relevant to said first user.

23. The method as claimed in claim 22 wherein, said first content item is a content item selected from expert content.

24. The method as claimed in claim 22 wherein, said second content item is a content item selected from user-generated content.

* * * * *